E. H. OBERTOP.
DRILL TESTING APPARATUS.
APPLICATION FILED SEPT. 23, 1914.
1,172,163.
Patented Feb. 15, 1916.
2 SHEETS—SHEET 1.
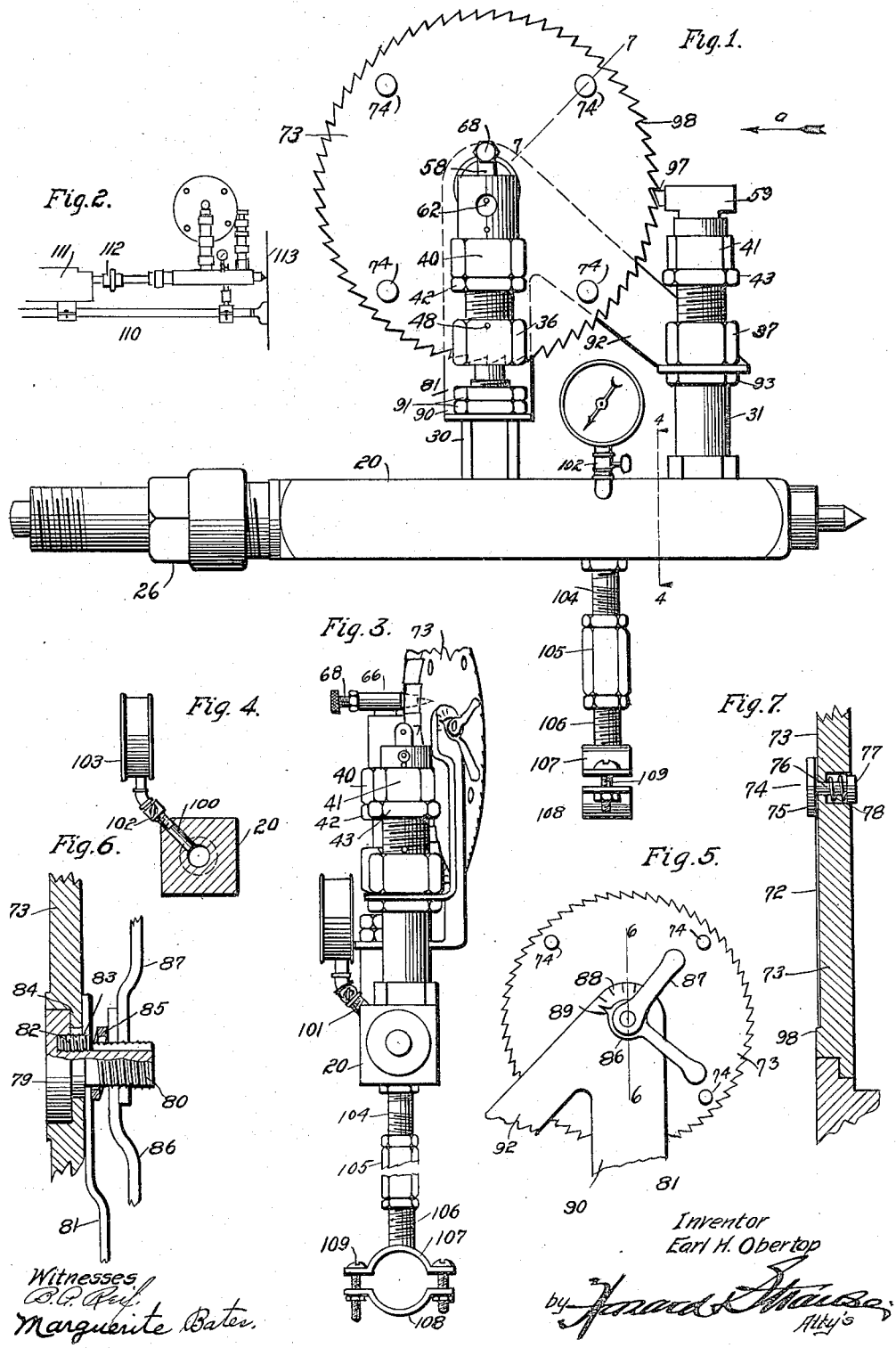
Witnesses
Marguerite Bates.
Inventor
Earl H. Obertop
by
Att'ys

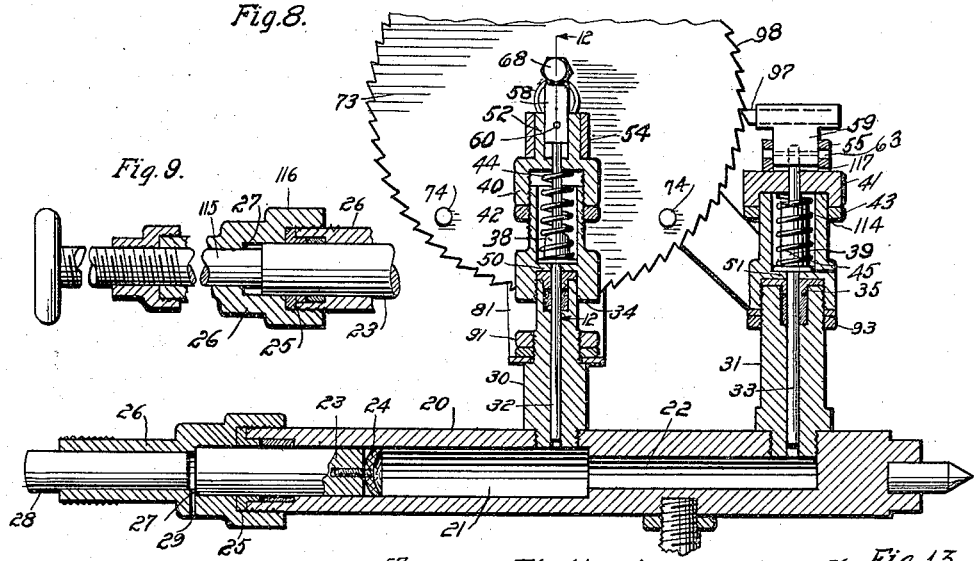

UNITED STATES PATENT OFFICE.

EARL H. OBERTOP, OF GOLDFIELD, NEVADA.

DRILL-TESTING APPARATUS.

1,172,163.  Specification of Letters Patent.  Patented Feb. 15, 1916.

Application filed September 23, 1914. Serial No. 863,199.

*To all whom it may concern:*

Be it known that I, EARL H. OBERTOP, a citizen of the United States, residing at Goldfield, in the county of Esmeralda, State of Nevada, have invented new and useful Improvements in Drill-Testing Apparatus, of which the following is a specification.

This invention relates to a drill testing apparatus.

It is the object of this invention to provide an apparatus by means of which the frequency and intensity of the impacts of a drill may be accurately determined and which is so constructed that it may be readily transported and carried throughout the mine to test the various drills without putting the latter out of operation.

Another object is to provide improvements in the construction of the drill testing apparatus disclosed in my co-pending application filed May 26, 1914, bearing Serial Number 841,020, in which a recording disk is intermittently rotated by the blows of the drill and markings are made on the disk during its rotation to indicate the force of the blows struck.

A particular object is to provide a drill testing apparatus which can be employed in testing drills of different types which deliver blows of various intensities and of different speeds.

Another object is to provide means for adjusting the apparatus to adapt it to receive blows of different intensities so that the movable parts actuated by the force of the blow will not be moved excessively when the device is applied to a high power drill.

Another object is to improve the construction of the actuated parts whereby they will quickly respond to the forces applied thereto and speedily returned to their normal position so as to insure an accurate operation of the recording mechanism.

A further object is to provide a simple and effective means for attaching the recording sheet to the rotary disk.

Another object is to provide a mounting for the graphic point whereby it is securely held against displacement in its proper relation to the recording sheet.

The invention is illustrated in the accompanying drawings, in which:

Figure 1 is a view of the testing apparatus in side elevation. Fig. 2 is a view illustrating the application of the invention. Fig. 3 is a view of the device in end elevation as seen in the direction indicated by the arrow —a—. Fig. 4 is a detail section on the line 4—4 of Fig. 1 partly in elevation. Fig. 5 is a detail rear view of the recording disk illustrating the device for adjusting the frictional mounting of same. Fig. 6 is an enlarged detail section on the line 6—6 of Fig. 5 showing the disk mounting. Fig. 7 is a detail section of the recording disk on the line 7—7 of Fig. 1 illustrating the manner of mounting the recording sheet on the disk. Fig. 8 is a view of the device in longitudinal section partly in elevation. Fig. 9 is a detail section illustrating an attachment for testing the device. Fig. 10 is a view in enlarged section of the disk actuating head. Fig. 11 is a plan view of same. Fig. 12 is an enlarged detail section of the stylus carrying head on the line 12—12 of Fig. 8. Fig. 13 is a plan view of same. Figs. 14 and 15 are views illustrating the manner of recording the force of the blows struck by a drill and the number of blows struck in a given time.

More specifically, 20 indicates the main body portion of the device which is formed with a longitudinally extending bore of differential diameters as indicated at 21 and 22; the larger bores 21 opening at one end of the body member 20 and the bore 22 connecting with the bore 21 and terminating in the body member 20 adjacent its opposite end. The bore 21 is designed to receive a piston 23 which is reciprocally mounted therein and is provided with a cup leather 24 on its inner end. The piston 23 extends through a stuffing gland 25 mounted on the outer end of the body member 20 and projects through a tubular extension 26 threaded on the member 20; the extension 26 having an internal shoulder 27 against which the outer end of the piston 23 is adapted to abut to limit the rearward movement of the piston.

The extension 26 is designed to receive a stem 28 by means of which the impact may be delivered to the piston 23 to drive the latter forwardly in the bore 21. As a means for permitting a free retracted movement of the piston 23 an orifice 29 is formed in the tubular extension 26 adjacent the shoulder 27, whereby compression of air rearward of the piston 23 is obviated.

Mounted on the upper face of the body member 20 is a pair of tubular standards 30 and 31, the lower open ends of which communicate with the bores 21 and 22 respectively. Reciprocally mounted in the standards 30 and 31 are plungers 32 and 33 which extend upwardly through stuffing glands 34 and 35 and terminate in tubular housings or extensions 36 and 37 threaded on the upper ends of the standards 30 and 31. The upper ends of the plungers 32 and 33 are formed with heads 36' and 37' which extend into sockets formed on the lower end of pistons 38 and 39 reciprocally mounted in the tubular extensions 36 and 37; the upper ends of the pistons 38 and 39 extending through caps 40 and 41 threaded on the upper ends of the tubular extensions 36 and 37 for vertical adjustment thereon.

Lock nuts 42 and 43 are threaded on the tubular members 36 and 37 to hold the caps 40 and 41 in their adjusted positions. The adjustment of the caps 40 and 41 is provided for the purpose of regulating the tension of springs 44 and 45 which encircle the pistons 38 and 39 within the tubular extensions 36 and 37 and bear between the caps 40 and 41 and flanges 46 and 47 formed on the lower ends of the pistons 38 and 39; the springs 44 and 45 acting to normally maintain the pistons in their lowermost positions. As a means for venting the interior of the extensions 36 and 37 to permit a free downward movement of the pistons 38 and 39 orifices 48 and 49 are formed in the sides of the extensions 36 and 37 adjacent the upper faces of partition walls 50 and 51 formed in the extensions 36 and 37 on which the pistons 38 and 39 normally seat.

Apertures 38' and 39' are formed in the pistons 38 and 39 and communicate with the upper ends of the sockets therein so as to prevent air compressing between the heads 36' and 37' on the plungers 32 and 33 and the upper ends of the sockets in the pistons 38 and 39, thus insuring close contact of the heads 36' and 37' with the pistons.

Formed in the caps 40 and 41 are spaced projections 52 and 53 having parallel inner faces and encircling the projections 52 and 53 are rings 54 and 55 rigidly secured thereto by means of screws 56 and 57. Slidably mounted between the projections 52 and 53 are blocks 58 and 59 to which the upper ends of the pistons 38 and 39 are attached by means of pins 60 and 61 which are inserted in position to engage the upper ends of the pistons 38 and 39 which extend into the blocks 58 and 59 through apertures 62 and 63 formed in the rings 54 and 55. The block 58 is formed with graduations 64 by means of which the tension of the spring 44 may be determined; the graduations 64 being read in relation to the upper edge of the ring 54.

The block 58 is formed with a head 66 having a transverse bore 67 therethrough, one end of which bore is internally threaded to receive a thumb-screw 68 adapted to be screwed in and out of the bore 67 to adjust the tension of the spring 69 therein which spring bears against a follower block 70 arranged to abut against the inner end of a graphic point or stylus 71. The stylus 71 is arranged to contact a recording sheet 72 mounted on a vertically disposed revoluble disk 73 and held in place on the latter by means of spring clamps 74 mounted on the disk 73 adjacent the outer edge of the latter. Each of the clamps 74 consists of a disk 75 formed with a stem 76 which extends through an aperture in the disk 73 and has a push button 77 formed on its outer end by means of which the stem 76 may be depressed in opposition to a spring 78 to move the disk 75 outwardly in relation to the face of the disk 73 to permit the introduction of the edge of the recording sheet 72 thereunder. The spring 78 operates to normally maintain the disk 75 in its clamping position.

The disk 73 is revolubly mounted upon a circular plate 79 having a threaded stem 80 extending rearwardly thereof through a standard 81 and held against rotation in relation to the standard by means of a set screw 82 which engages the rear face of the plate 79 and extends through a slot 83 in the standard 81 to hold the plate 79 and the threaded stem 80 thereon against rotation but permit of their longitudinal movement in relation to the standard. The plate 79 engages a flange 84 on the disk 73 in frictional contact therewith to prevent the too free rotation of the disk 73; means being provided for regulating the degree of frictional engagement between the plate 79 and the flange 84. This means consists of a spring washer 85 encircling the stem 80 adjacent the rear face of the standard 81 and a handled nut 86 which screws on the stud 80 and is adapted to bear against the spring washer 85 which washer will thus operate to exert an inward pull on the plate 79.

A handled lock nut 87 is threaded on the stud 80 in contact with the nut 86 to lock the latter against rotation. The disk 73 being designed to be rotated by impacts on its periphery as will be later described, which may be of varying forces according to the type of drill to which the apparatus is attached, it is essential to provide means for determining the extent of the frictional engagement of the disk 73 by which it may be adjusted according to the force employed in rotating the disk. This means consists in forming a series of graduations 88 on the rear face of the standard 81 and fitting the nut 86 with a pointer 89 adapted to register with the graduations 88.

By adjusting the nut 86 according to the graduations 88 the amount of resistance offered to the rotation of the disk 73 may be regulated as desired.

The standard 81 comprises a flat plate 90 which has an inturned lower end which encircles the standard 30 and is secured to the latter by means of nuts 91; the plate 90 being formed integral with the diagonally extending plate 92 having an apertured inturned end which encompasses the standard 31 and is held in place on the latter against a shoulder formed by a nut 93 by means of the threaded extension 37.

The block 59 is formed with a longitudinally extending bore 94 in which a stem 95 is reciprocally mounted; a coiled spring 96 normally maintaining the stem 95 in its advanced position to maintain a pawl 97 formed on the outer end thereof in engagement with ratchet teeth 98 formed on the outer periphery of the disk 73. The stem 95 and pawl 97 extend approximately in alinement with the disk 73 and on a plane slightly below the horizontal plane of the axis of the disk 73. The ratchet teeth 98 extend in such direction on the periphery of the disk 73 as to normally engage the upper face of the pawl 97 in such manner that when the latter is moved upwardly the disk 73 will rotate therewith; the disk 73 remaining stationary during the downward movement of the pawl 97.

The plungers 32 and 33 with the pistons 38 and 39 carrying the heads 66 and 96 are normally maintained in their lowermost positions by means of the springs 44 and 45; the stylus 71 being normally positioned adjacent the inner edge of the recording sheet 72 adjacent a hub 98 on the disk 73. The space within the bores 21 and 22 is filled with any suitable liquid which is introduced therein through an aperture 100 formed in the member 20 and which aperture is closed by means of a nipple 101 connecting with a cut-off valve 102 mounted on a pressure gage 103 of any suitable description; the valve 102 being normally closed.

As a means for mounting the body member 20 for vertical adjustment a downwardly extending threaded stem 104 is mounted thereon which engages a turn buckle 105, the opposite end of which is in threaded engagement with a stem 106 having a clamping member 107. A complementary clamp member 108 is secured to the member 107 by means of screws 109. The clamp members 107 and 108 are adapted to engage a rod 110 carried by the frame of a rock drill 111 or other suitable support.

In the application and operation of the invention, the boring member of the drill 111 is removed from the chuck 112 thereof and the bar 28 is substituted therefor; this bar being positioned in the tubular extension 26 with its outer end adjacent the end of the piston 23 as shown in Fig. 8; the body member 20 being rigidly mounted on its support in horizontal alinement with the drill 111 as particularly shown in Fig. 2 with its outer end abutting against a rigid wall or support 113. The drill 111 on being set in operation causes the member 28 to impact against the piston 23, thereby advancing the latter in the bore 21 and causing the liquid therein to elevate the plungers 32 and 33 in opposition to the springs 44 and 45.

The upward movement of the piston 33 is limited by a shoulder 114 on the piston 39 abutting against the underside of the cap 45, which movement is sufficient to cause the pawl 97 to advance the disk 73 a distance equivalent to the length of the tooth 98 in opposition to the frictional engagement of the disk by the plate 79. Simultaneous with this rotary movement of the disk 73 the plunger 32 and piston 38 carrying the stylus 71 will move vertically a distance proportionate to the force of the blow delivered to the piston 18; the stylus 71 forming a line on the sheet 72.

Immediately after each blow on the piston 23 the springs 44 and 45 operate to restore the pistons 38 and 39 and the plungers 32 and 33 to their normal lowermost positions; the downward movement of the plungers 32 and 33 being limited by the heads 36' and 37' thereof coming into engagement with the walls 50 and 51. The downward movement of the plungers 32 and 33 operates to retract the piston 23 through the medium of the liquid in the bores 21 and 22. In this manner by the successive blows delivered to the piston 23 which are necessarily in rapid succession, the disk 73 will be advanced one step and the stylus reciprocated one stroke, thereby forming a series of lines on the sheet 41 as indicated in Figs. 14 and 15. If the force of the successive blows delivered to the piston 23 are equal the lengths of the successive strokes of the plunger 33 and the stylus 70 carried thereby will be equal, thereby forming lines of equal length on the sheet 72 as shown in Fig. 14.

If there is any variation in the force of the blows, the movements of the marking point 71 will be correspondingly varied and the lines formed thereby on the sheet 72 will be irregular as shown in Fig. 12, thus indicating a leakage in the drill 111, or other cause, by which its efficiency is impaired.

To determine the number of strokes delivered in a given time say per minute, the drill is operated continuously for five seconds, whereupon it is stopped and the number of radial marks formed on the sheet 72 counted, which number, when multiplied by twelve, will give the number of strokes delivered by the drill in a minute's time.

In order to determine the force of the blows delivered by the drill the device is tested by means of the implement shown in Fig. 9, which consists of a threaded stem 115 which is introduced into the tubular extension 26 in lieu of the rod 28 and a threaded sleeve 116 on the stem 115 screwed on the extension 26. The stem 115 is then advanced in its threaded bearing in the sleeve 116 against the piston 23, thereby advancing the latter against the liquid in the bores 21 and 22 which will operate to elevate the plungers 32 and 33 in opposition to the springs 44 and 45. By opening the valve 102 the pressure thus exerted on the piston 23 will be indicated by the pressure gage 103, whereupon different elevated positions of the stylus 71 may be indicated on the sheet 72 by concentric circles as shown in Figs. 14 and 15 which circles constitute gage marks and may be numbered according to the pressures indicated by the gage 103. This is usually done as a means of testing the device before putting same in operation, thus compensating for any decrease in tension of the springs 44 and 45.

The tubular extensions 36 and 37 are designed to be disconnected from the standards 30 and 31 to permit different heads carrying springs of various tension according to the power of the drill to be tested.

As a means for insuring quick return movements of the blocks 58 and 59 vent apertures 117 and 118 are formed in the rings 54 and 55 beneath the blocks 58 and 59 so that there will be no compression of air beneath said blocks on their downward stroke. Likewise a vent aperture 119 is formed in the block 59 rearward of the stem 95 to open the chamber 94 to the atmosphere and permit free movement of the stem 95 in either direction.

What I claim is:

1. In a drill testing apparatus, a body member having a liquid receiving chamber therein, a piston reciprocally mounted in said chamber adapted to be impacted by a member on the drill, a disk revolubly mounted on and carried by the body member, means operated through the liquid for rotating said disk, and adjustable means for frictionally engaging the disk.

2. In a drill testing apparatus, a body member having a liquid receiving chamber therein, a piston in said chamber adapted to be advanced by the impact of a member on a drill, a revoluble disk mounted on and carried by the body member, a plunger adapted to be actuated by the fluid in the body member, a piston removably attached to said plunger, a spring for normally maintaining said piston and plunger in their lowermost positions, and a pawl carried by said piston adapted to engage the disk to rotate the latter intermittently on each impulse of the plunger.

3. In a drill testing mechanism, a rotary disk, a reciprocal member adapted to be actuated by a drill, means controlled by said reciprocal member for rotating said disk in step by step fashion on successive advance movements of the reciprocal member, and means for impeding the rotation of said disk.

4. In a drill testing mechanism, a rotary disk, a reciprocal member adapted to be actuated by a drill, means controlled by said reciprocal member for rotating said disk in step by step fashion on successive advance movements of the reciprocal member, means for impeding the rotation of said disk comprising a frictional member engaging the plate, means for holding said member against rotation, and means for adjusting the frictional engagement with the plate to various degrees.

5. In a drill testing apparatus, a body member having a liquid receiving chamber therein, a piston in said chamber, a spring for normally retracting the piston in each chamber adapted to be impacted by a drill, a rotary disk, means for indicating the force of the impact of said piston on the disk, means for rotating the disk, and friction means for impeding the rotation of the disk.

6. In a drill testing apparatus, a body member having a liquid receiving chamber therein, a piston in said chamber, a spring normally retracting the piston in said chamber adapted to be impacted by a drill, a rotary disk, means for indicating the force of the impact of said piston on the disk, means for rotating the disk, friction means for impeding the rotation of the disk, and means for adjusting the friction means.

7. In a drill testing apparatus, a cylinder, a spring pressed piston mounted therein, a stylus carrying head mounted on said piston, means for regulating the spring pressure on said piston, and means on said head for indicating the degree of adjustment of the spring pressure.

In witness that I claim the foregoing I have hereunto subscribed my name this 8th day of September, 1914.

EARL H. OBERTOP.

Witnesses:
 MARGUERITE BATES,
 MARIE BATTEY.

Copies of this patent may be obtained for five cents each, by addressing the "Commissioner of Patents, Washington, D. C."